(12) United States Patent
Ellmer

(10) Patent No.: US 7,007,457 B2
(45) Date of Patent: Mar. 7, 2006

(54) METHOD FOR MONITORING THE LIGHT-OFF PERFORMANCE OF AN EXHAUST GAS CATALYTIC CONVERTER SYSTEM

(75) Inventor: Dietmar Ellmer, Regensburg (DE)

(73) Assignee: Siemens Aktiengesellschaft, Munich (DE)

(*) Notice: Subject to any disclaimer, the term of this patent is extended or adjusted under 35 U.S.C. 154(b) by 187 days.

(21) Appl. No.: 10/769,179

(22) Filed: Jan. 30, 2004

(65) Prior Publication Data
US 2004/0210378 A1 Oct. 21, 2004

(30) Foreign Application Priority Data
Jan. 31, 2003 (DE) .................. 103 03 911

(51) Int. Cl.
F01N 3/00 (2006.01)
(52) U.S. Cl. .................. 60/274; 60/277; 73/118.1
(58) Field of Classification Search .................. 60/274, 60/276, 277, 299; 73/118.1
See application file for complete search history.

(56) References Cited

U.S. PATENT DOCUMENTS

| | | | | |
|---|---|---|---|---|
| 5,339,628 A | * | 8/1994 | Maus et al. .................. | 60/277 |
| 5,414,994 A | * | 5/1995 | Cullen et al. .................. | 60/274 |
| 5,428,956 A | * | 7/1995 | Maus et al. .................. | 60/277 |
| 5,626,014 A | * | 5/1997 | Hepburn et al. .............. | 60/274 |
| 5,706,652 A | * | 1/1998 | Sultan .......................... | 60/274 |
| 5,732,549 A | * | 3/1998 | Treinies et al. ............... | 60/274 |
| 5,896,743 A | * | 4/1999 | Griffin .......................... | 60/274 |
| 6,502,386 B1 | * | 1/2003 | Mazur et al. ................. | 60/277 |
| 6,651,422 B1 | * | 11/2003 | LeGare ........................ | 60/277 |

FOREIGN PATENT DOCUMENTS

| | | |
|---|---|---|
| DE | 42 41 494 A1 | 6/1994 |
| DE | 43 02 039 A1 | 7/1994 |
| DE | 43 30 997 A1 | 3/1995 |
| DE | 197 53 842 A1 | 6/1999 |
| DE | 100 51 562 A1 | 4/2002 |
| DE | 100 36 942 A1 | 5/2002 |
| DE | 101 18 327 A1 | 10/2002 |

OTHER PUBLICATIONS

Das Audi SULEV-Turbokonzept; B. Pfalzgraf et al.; Dresden, 9/10, pp. 53-79, Jun. 2002.

* cited by examiner

Primary Examiner—Thomas Denion
Assistant Examiner—Diem Tran
(74) Attorney, Agent, or Firm—Baker Botts L.L.P.

(57) ABSTRACT

It is proposed that a quantity of heat input fed with the exhaust gas to the light-off area (8) during hot running up to a point in time be used as a criterion for successive conversion (light-off) in the downstream consecutive subvolumes (8a) of the light-off area (8) and that the functional capabilities of at least one of the downstream subvolumes (8a) heated consecutively be tested and evaluated individually at any moment of the light-off. The local variation of the catalytic converter efficiency can thus be monitored in the light-off area (8).

10 Claims, 2 Drawing Sheets

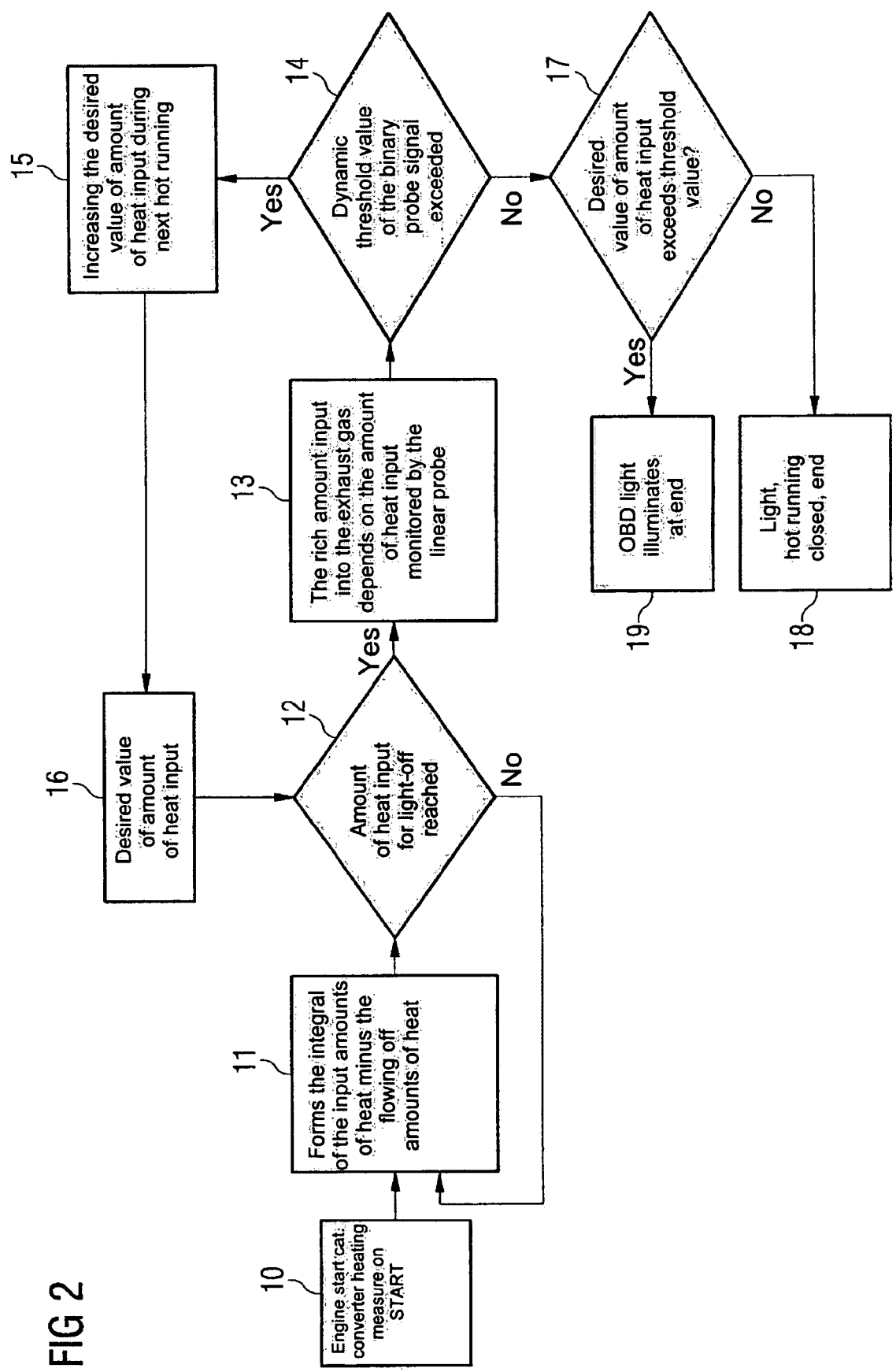

METHOD FOR MONITORING THE LIGHT-OFF PERFORMANCE OF AN EXHAUST GAS CATALYTIC CONVERTER SYSTEM

PRIORITY

This application claims foreign priority of the German application DE 10303911.2 filed on Jan. 31, 2003.

TECHNICAL FIELD OF THE INVENTION

The invention relates to a method for monitoring the light-off performance of an exhaust gas catalytic converter system in the exhaust gas duct of an internal combustion engine, in which case, an exhaust gas arising from the combustion of an air/fuel mixture is fed to the exhaust gas catalytic converter system and in which the light-off performance is evaluated on the basis of the conversion capacity in a light-off area of the exhaust gas catalytic converter system substantially influencing the emissions of the engine running hot.

DESCRIPTION OF THE RELATED ART

Such a method is already known from DE 43 30 997 A1.

Modern motor vehicle engines usually use a catalytic converter for reducing the exhaust gas emissions that they generate. Such converters chemically change the gas mixture generated by the engines and therefore contribute towards satisfying the different environmental regulations governing exhaust gas emissions. Recently, the intensification of the legal regulations does not only concern the exhaust gas emissions, but increasingly also the requirements for monitoring the operating performance or the functional capabilities of the exhaust gas catalytic converter system designated below as a catalytic converter system in a simplified manner within the framework of a self-diagnosis during normal vehicle operation, a so-called on-board diagnosis (OBD).

In the case of normal operation, modern three-way catalytic converters together with a lambda control system can reduce the concentration of the three main undesired exhaust gases, hydrocarbons, carbon monoxides and various nitrogen oxides by approximately 90%. The maximum conversion of all three exhaust gas components requires that the engine is operated with an air/fuel ratio of lambda=1. In order to achieve the precise mixture control required, it is known that the control of the injection valves resulting from operating data is also overlaid by the so-called lambda control. Therefore, a lambda probe arranged in the exhaust gas system determines whether or not the mixture is set too rich or too lean. Depending on the signal of the probe, a correction factor for the injection duration is calculated in the control unit so that a lambda value=1 is set in the control unit. In the meantime, for the further improvement of the lambda control relation, highly developed 3-lambda probe concepts are known together with phase catalytic converters, in which case, a linear primary catalytic converter lambda probe, a first binary lambda probe (intermittent probe) are provided downstream of the primary catalytic converter and a second intermittent probe downstream of the phase catalytic converter, cf. B. Pfalzgraf et al., "Das Audi-SULEV-Turbokonzept" (The Audi SULEV turbo concept) in: conference volume "Emission-Control", Dresden, 9/10 Jun. 2002, pp. 53 to 79.

Also in the case of an optimum lambda control strategy, sufficiently high conversion rates can be achieved only with catalytic converter systems that have a sufficient conversion capacity in all the operating ranges. In order to determine the functional capabilities of a catalytic converter system at operating temperature, the oxygen storage capacity in the catalytic converter can be evaluated on the basis of measurements in which case, in general, the correlation of the oxygen storage capacity with the functional capabilities of the catalytic converter, i.e. the catalytic converter efficiency, is taken as a starting point. This assumption is also used as a basis for the following. According to the assumption, an outdated catalytic converter clearly has a poorer oxygen storage performance. In the case of such a known method, in addition to the probe located upstream of the catalytic converter, a second probe is typically also fitted downstream of the catalytic converter and the signal amplitudes of the probe downstream of the catalytic converter are compared with the signal amplitudes upstream of the catalytic converter.

Modern exhaust gas limits take the highest possible conversion rates over extended operating ranges and therefore set very low total limits. However the catalytic converter reaches its operating range, i.e. a good efficiency, only if its temperature is above the so-called light-off temperature (approximately 350° C.) for which reason the emission behavior also increasingly plays a key role during cold start or hot running.

Therefore, to actually be able to adhere to the overall limits it is imperative that the light-off temperature be reached as quickly as possible. Different hot running strategies or catalytic converter heating measures are known that should accelerate the light-off for example by fitting the catalytic converter close to the engine and/or by increasing the exhaust gas energy by means of secondary air injection. Therefore, the decisive variables in this context are the quantity of heat introduced with the exhaust gas to the exhaust gas duct and the thermal masses to be heated along the exhaust gas duct. Usually, because the catalytic converter locally loses its efficiency over the service life of the vehicle, a heating strategy is used that does not depend on the aging state of the catalytic converter and, as far as possible, enables a quick heating process.

In future, according to the specifications of the extended on-board diagnosis (OBD 2) the failure or the reduction of the efficiency of all the emission-relevant components must be detected. Because the light-off performance of a catalytic converter, for the above-mentioned reasons, is extremely emission-relevant for the total emission relation of a certification driving cycle, a decrease in the light-off performance must be monitored according to the OBD requirements and should the limits be exceeded this must be shown by means of the OBD light.

This type of method known from the above-mentioned DE 43 30 997 A1 assumes that to reach hot running with low emissions it usually suffices to convert the area of the catalytic converter system, i.e. the light-off area where the exhaust gases first flow through and is therefore decisive for hot running emissions. Therefore, the light-off performance of the catalytic converter system is evaluated on the basis of the conversion capacity of the light-off area, in which case, this is formed by the primary catalytic converter in the phase catalytic converter or otherwise by the front area of the catalytic converter. A detailed proposal is made to detect the temperature of the light-off area at operating temperatures preferably by means of a temperature sensor and the light-off performance of the catalytic converter is evaluated on the basis of the effects of the supply of the air/fuel mixture on this temperature. Because the conversion is an exothermal process, a slight increase in the temperature correlates with a low conversion capacity in the light-off area.

Since with the known method the overall functional capabilities of the light-off area are evaluated, in the same way as other known methods that derive a light-off diagnosis from the catalytic converter efficiency diagnosis that is carried out in the case of a hot catalytic converter (oxygen storage comparison with limiting catalytic converter) this approach involves a substantial risk because these approaches give no information about the efficiency of the catalytic converter as a function of the location.

Incidentally it is known from DE 197 53 842 A1 in a method for operating an exhaust gas catalytic converter that at least one heating measure must be introduced to accelerate the heating process and that it must again be deactivated on reaching the light-off temperature. The thermal energy fed to the catalytic converter via the exhaust gas is used as a criterion for reaching the light-off temperature and the heating measures are deactivated if the energy absorbed exceeds a predefined threshold value.

SUMMARY OF THE INVENTION

The object of the invention is to monitor the light-off performance of a catalytic converter system in a motor vehicle.

A method for monitoring the light-off performance of a catalytic converter system in the exhaust gas duct of an internal combustion engine, comprises the steps of:

feeding an air/fuel mixture to the catalytic converter system, evaluating the light-off performance on the basis of the conversion capacity in a light-off area of the exhaust gas catalytic converter system substantially influencing the emissions of the engine running hot, using a quantity of heat input fed with the exhaust gas to the light-off area during hot running up to a point in time as a criterion for successive conversion (light-off) in the downstream consecutive subvolumes of the light-off area, and individually testing and evaluating the functional capabilities of at least one of the downstream subvolumes heated consecutively at the respective moment of the light-off.

The method may further comprise the steps of:

at least at one of the points in time at which a predefined quantity of heat input is reached and a light-off of the corresponding subvolumes can be taken as a starting basis, feeding the catalytic converter system with a defined rich quantity of exhaust gas during lean hot running, checking the exhaust gas by means of an operational exhaust gas oxygen probe arranged downstream in the vicinity of the light-off area on starting the conversion, and on the basis of the effects of the supply of the defined rich quantities of exhaust gas at the corresponding points in time on the exhaust gas lambda, evaluating the functional capabilities of at least one subvolume of the light-off area.

During the hot running process, the functional capabilities of at least two equally-sized downstream consecutive subvolumes can be tested one after the other in the given order, while the catalytic converter system at the consecutive points in time of the light-off of at least two subvolumes is in each case fed with a rich quantity of exhaust gas depending on the quantity of heat input at the specific point in time. For evaluating the functional capabilities of a specific subvolume, should the exhaust gas lambda not remain lean during the passage of a defined quantity of exhaust gas, the length in time of the rich exhaust gas lambda signal can be used to evaluate the functional capabilities of the subvolume. The rich quantity of exhaust gas provided for examining a specific subvolume can, depending on the result of the evaluation of the upstream subvolume to be examined, specifically be selected in such a way that when a quantity m of the upstream subvolumes were evaluated as operable, a rich quantity of exhaust gas is sent to examine the specific subvolume that is measured in such a way that m+1 lighted-off and operable subvolumes ought to be present to keep the resulting exhaust gas lambda lean. The catalytic converter system, at the point in time when there is a quantity of heat input that is sufficient for the light-off of first only the downstream first subvolume, can be fed with a rich quantity of exhaust gas matching the first subvolume and the hot running when the exhaust gas lambda remains lean can be evaluated as positively closed and when the exhaust gas lambda becomes rich, in the next hot running, a quantity of heat input results that is sufficient for the light-off of only the first two subvolumes that are mainly equally large whereupon a rich quantity of exhaust gas matching a subvolume is sent to the catalytic converter system so that the downstream consecutive subvolumes of the light-off area can be checked in succession in consecutive hot running processes while, in the preceding hot running processes, the first up to nth subvolume were evaluated as non-operable and there is in the (n+1)th hot running a quantity of heat input that is sufficient for the first up to (n+1)th subvolume and a rich quantity of exhaust gas matching a subvolume is then sent to the catalytic converter system. A binary exhaust gas oxygen probe can be used to monitor the light-off performance. The defined input of rich quantities of exhaust gas can be controlled by means of a linear exhaust gas oxygen probe arranged upstream of the catalytic converter system. The lambda probes of a phase catalytic converter controlled by 3-lambda probe controls can be used for monitoring the light-off performance and the conversion capacity of a phase catalytic converter, wherein a linear primary catalytic converter lambda probe, a first binary lambda probe arranged between the primary and main catalytic converter to serve as monitor of the light-off performance and a second binary lambda probe arranged downstream of the phase catalytic converter to serve as monitor of the conversion capacity of the phase catalytic converter can be provided. The method can be used within the framework of an on-board diagnosis and/or as a workshop diagnosis.

The method according to the invention of the type mentioned at the start achieves the object of the invention by means of the fact that a quantity of heat input fed with the exhaust gas to the light-off area during hot running up to a point in time is used as a criterion for successive conversion (light-off) in the downstream consecutive subvolumes of the light-off area, and that the functional capabilities of at least one of the downstream subvolumes heated consecutively is tested and evaluated individually at the moment of light-off.

According to the invention, the differentiation between different downstream consecutive segments or subvolumes of the light-off area allows locally differentiated information about the conversion abilities in the light-off area and therefore increases the security of diagnosis of the light-off performance. From the local variation of the conversion capacity, distinctions can particularly be drawn regarding a downstream homogeneous or inhomogeneous aging in the volumes of the catalytic converter. Therefore, according to the method of the invention advantageous aging forms can be distinguished and be taken into consideration with regard to the conversion at the light-off point in time. The method makes it possible to test the total light-off areas one after the other or only a part of the functional capabilities. The defined quantity of heat input required to evaluate the subvolumes can be determined or controlled offhand with known measures such as a temperature model or measurements.

The method according to the invention can be simply executed by, first of all, at least at one of the points in time at which a predefined quantity of heat input is reached and a light-off of the corresponding subvolumes can be taken as a starting basis, feeding to the catalytic converter system a defined rich quantity of exhaust gas during lean hot running. The exhaust gas is checked by means of an operational exhaust gas oxygen probe arranged downstream in the vicinity of the light-off area on starting the conversion, in which case, on the basis of the effects of the supply of the defined rich quantities of exhaust gas at the corresponding points in time on the exhaust gas lambda, the functional capabilities of at least one subvolume of the light-off area are evaluated.

Particularly advantageous is the possibility that during the hot running process, the functional capabilities of at least two equally-sized downstream consecutive subvolumes are tested one after the other in the given order, while the catalytic converter system at the consecutive points in time of the light-off of at least two subvolumes is in each case fed with a rich quantity of exhaust gas depending on the quantity of heat input at the specific point in time.

Checking can also be implemented in two ways, that can also be used in combination. On the one hand, for evaluating the functional capabilities of a specific subvolume, should the exhaust gas lambda not remain lean during the passage of a defined quantity of exhaust gas, the length in time of the rich exhaust gas lambda signal can be used to evaluate the functional capabilities of the subvolume. On the other hand, the rich quantity of exhaust gas provided for examining a specific subvolume can, depending on the result of the evaluation of the upstream subvolume to be examined, specifically be selected in such a way that when a quantity m of the upstream subvolumes were evaluated as operable, a rich quantity of exhaust gas is sent to examine the specific subvolume that is measured in such a way that m+1 lighted-off and operable subvolumes ought to be present to keep the resulting exhaust gas lambda lean.

The light-off area can also, in a simplified sense, be checked in such a way that in consecutive hot running processes a successive check can be performed as to whether or not a subvolume is still operable.

The method according to the invention can advantageously be integrated in the increasingly standard technical context given when post-treating the exhaust gas by using the lambda probes of a phase catalytic converter controlled by 3-lambda probe controls for monitoring the light-off performance and the conversion capacity of a phase catalytic converter, in which case, a linear primary catalytic converter lambda probe, a first binary lambda probe arranged between the primary and main catalytic converter to serve as monitor of the light-off performance and a second binary lambda probe arranged downstream of the phase catalytic converter are provided to monitor the conversion capacity of the phase catalytic converter.

Particularly advantageous is the fact that the method according to the invention can be used both within the framework of an on-board diagnosis and a workshop diagnosis.

BRIEF DESCRIPTION OF THE DRAWINGS

Embodiments of the invention are explained below on the basis of the accompanying drawings. They are as follows:

FIG. 2 a flow chart of the method according to the invention.

DETAILED DESCRIPTION OF THE PREFERRED EMBODIMENTS

Figure 1:
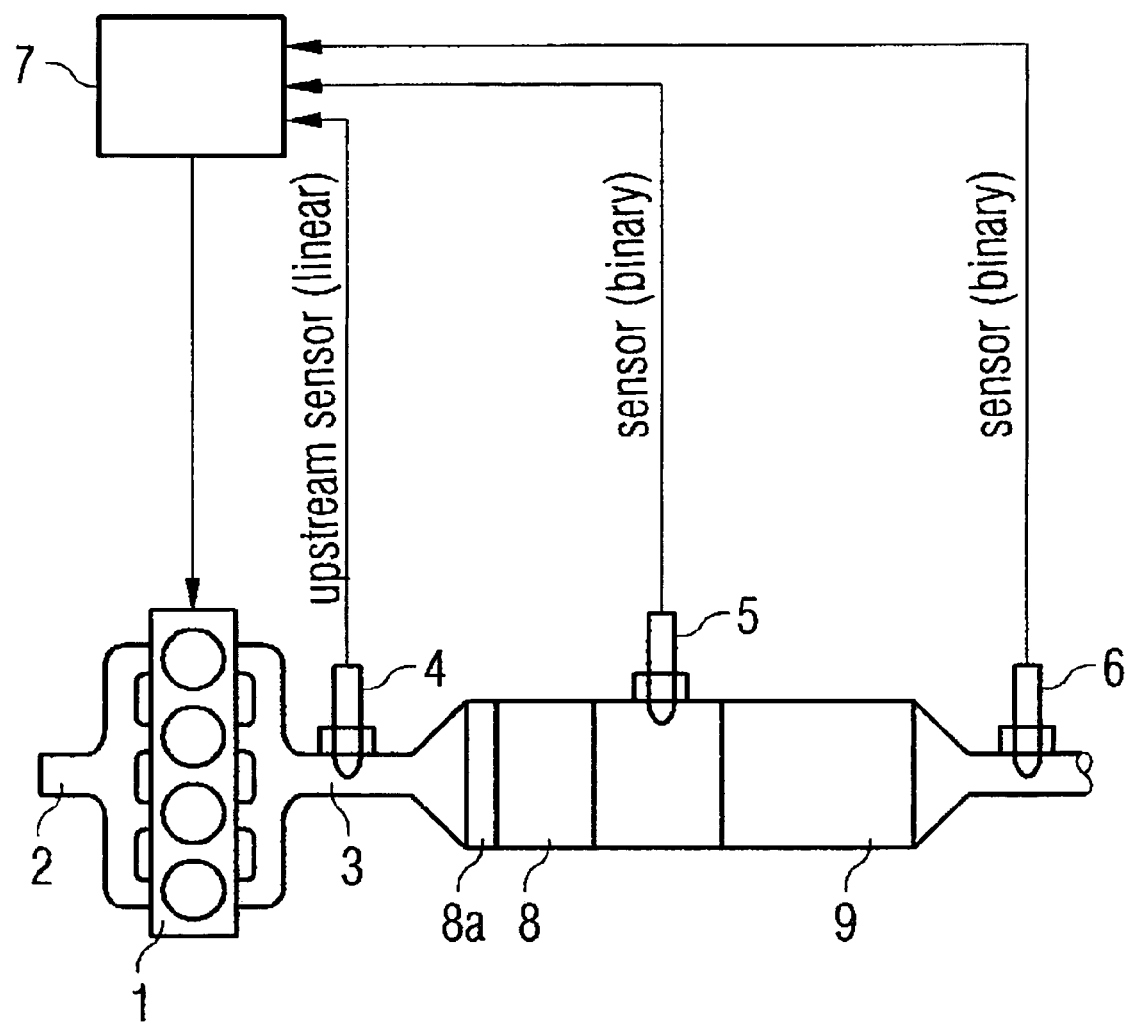
FIG. 1 an overview of an internal combustion engine and several components that are of significance in connection with the invention.

FIG. 1 is restricted to the highly schematic representation of an internal combustion engine 1 and of the further components that are the most important for the invention. An air/fuel mixture is fed to the internal combustion engine 1 via an intake duct 2 and the exhaust gases are released in an exhaust gas duct 3. For example, an air mass flow sensor, a throttle valve and one or more injection nozzles not shown here can be fitted in the intake duct 2. Three exhaust gas oxygen probes 4, 5 and 6 are arranged in the exhaust gas duct 3 in the flow direction of the exhaust gas in front of the primary catalytic converter 8 between the primary and main catalytic converter 9 as well as behind the main catalytic converter 9. The exhaust gas oxygen probes 4, 5 and 6 are connected in each case via connecting lines to a control unit 7 that evaluates the probe signals as well as further sensor signals and particularly activates the injection nozzle or the injection nozzles of the internal combustion engine 1 via further connecting lines. In order to carry out the method according to the invention it is not imperative that all the components shown in FIG. 1 are present at the same time. Depending on the embodiment, one component or several components can be dispensed with. A particularly important component for the method according to the invention is the exhaust gas oxygen probe 5 arranged downstream of the primary catalytic converter 8 that serves to detect the changes in the exhaust gas depending on the conversion capacity in the primary catalytic converter 8 if the catalytic converter system is fed specifically beforehand with a defined rich quantity of exhaust gas during lean hot running as described in greater detail below.

However, the invention cannot just be used together with a phase catalytic converter 8, 9 that is installed close to the engine as shown in FIG. 1. An exhaust gas system that is only ideally divided into two parts called monoliths is of equal value, as far as possible. The second monolith 9 can for example be formed by an underbody catalytic converter so that the spatial separation of the two monoliths 8 and 9 is considerably greater than is shown. In principle, a diesel catalytic converter can also be monitored according to the invention.

Likewise, it is also possible to use the method according to the invention in an internal combustion engine in which fuel is directly injected into the combustion chambers of the cylinders.

The new lambda control concepts with three lambda probes provide a linear primary catalytic converter lambda probe 4 to exactly measure the air/fuel mixture and also a first binary lambda probe 5 (intermittent probe) downstream of the primary catalytic converter 8 and a second intermittent probe 6 downstream of the phase catalytic converter for readjustment. The linear primary catalytic converter lambda probe 4 is also used advantageously according to the invention to control the defined input of rich quantities of exhaust gas required to diagnose individual subvolumes, i.e. it monitors whether or not the correct, defined quantities of exhaust gas are actually on the way. However, the first intermittent probe 5 that is essential for the invention could also be replaced just as well with a more costly linear lambda probe. Therefore, the first two probes 4 and 5 known from the 3-lambda probe concept are used advantageously according to the invention to monitor or diagnose the light-off of the exhaust gas secondary treatment. The secondary catalytic converter lambda probe 6 can be used to diagnose the performance of a catalytic converter at an operating temperature state; this probe is normally not yet at operating temperature during hot running.

On configuring the catalytic converter system according to FIG. 1 for executing the method according to the invention, the volume or the downstream extent of the first monolith, i.e. the light-off area 8, must at most be selected in such a way that the two front lambda probes 4 and 5 are operational at the latest point in time of the light-off in the case of a limiting monolith (limiting brick), i.e. itself heated sufficiently in order not to be jeopardized by the known water shock problem. The state of readiness of the probe throughout the pure heating process is at present approximately 7 to 11 seconds. Therefore, the latest point in time $T_{max}$ of the light-off is in a positive sense (OBD light does not illuminate) defined in such a way that, at this point in time, there is a basic degree of conversion of the catalytic converter volume that locally has a sufficiently high temperature level and a sufficiently high catalytic efficiency so that, in essence, the total emission limits can still be accomplished. In this sense, $T_{max}$ correlates with a maximum quantity of heat input.

The special meaning of the differentiation possibilities according to the invention regarding the functional capabilities of individual, consecutive downstream segments (subvolumes) 8a lies in the OBD-relevant light-off diagnosis of the catalytic converter system that has greater diagnostic security than known methods. Therefore, on the one hand, it may occur in practice that the oxygen storage capacity and in correlation with that, the catalytic activity are distributed equally over the total volume of the light-off area 8 (e.g. in the case of thermal aging). In this case, there will clearly be a different light-off performance than if there is an inhomogeneous oxygen storage for example, approximately when the first layers or segments 8a are contaminated on the front side by poor fuel and are therefore completely inactive and the remaining volumes of the light-off area 8 have a higher catalytic activity (different oxygen storage capacity) than the total volume of the light-off area 8 when the aging is distributed equally. The method according to the invention can distinguish these forms of aging and take them into consideration with a view to the conversion at the light-off moment.

The invention makes possible the diagnosis of a maximum volume of the light-off area 8 that has to be heated and sufficiently active in borderline cases in order to safely distinguish the total emission limits. As a result, the diagnostic method according to the invention also generates exotherms in the catalytic converter for heating it right through more quickly. The increased diagnostic security can be used, if required, to break down safety reserves by higher noble metal charges.

FIG. 2 uses a flow chart to show the steps to be executed in the preferred embodiment for monitoring the light-off performance. An emission quantity is emitted up to the point in time $T_{max}$ so that the limits can still be adhered to with the catalytic effect to be used. In the first step 10, hot running commences with cold start of the internal combustion engine, in which case, exhaust gases heated to several hundred ° C. successively heat the catalytic converter system downstream.

In actual cases, the rate at which heating takes place that is sufficient for the light-off up to whatever downstream segment or subvolume 8a, particularly depends on the thermal masses to be heated except for the quantity of heat input. In the next step 11, the quantity of heat actually input in the light-off area 8 is for example determined by means of a temperature model or by means of a sensor system in a customary way, i.e. the integral of the input quantities of heat minus the flowing off quantities of heat is formed. As a result, in the next step 12 a request can be made to determine whether or not a quantity of heat input that is sufficient for the light-off of a specific subvolume 8a to be examined should have been reached at a specific point in time. Should this not be the case, return to step 11, i.e. further heating.

However, should the request in step 12 be applicable, step 13 follows step 12. In step 13, one or several defined rich quantities of exhaust gas are fed to the catalytic converter system to diagnose lean hot running (here, lean refers to the exhaust gas lambda) as it basically can be generated with or without secondary air. Within the general framework of the invention, these rich quantities of exhaust gas can be monitored by the linear lambda probe 4 and the rich quantity input into the exhaust gas can particularly depend on the quantity of heat input according to step 11 in the manner described further below.

If at these points in time when the catalytic converter system in each case is fed with a defined rich quantity of exhaust gas, a sufficient oxygen storage capacity and with that sufficient subvolumes are active, the rich quantities of exhaust gas react with the stored oxygen so that the binary lambda probe signal of probe 5 remains lean. On the other hand, if the specific quantity of rich exhaust gas passing through results in a rich binary probe signal breakdown direction, the oxygen storage capacity activated by the heating process is too small. This relationship is interrogated in step 14. If the binary lambda probe signal actually becomes rich, it is mostly wise not to necessarily trigger an OBD warning signal immediately because, in general, downstream of a subvolume 8a of the light-off area 8 classified as not operable there still is available at least a further subvolume within the light-off area 8 throughout which, provided that it can still be heated by a higher heat input than the previous heat input, but that still within the period $T_{max}$, sufficient catalytic activity can be generated. Therefore, should the request in step 14 be applicable, the desired value of the quantity of heat is increased during the next hot running and in step 16 a return is made to step 12 with the target of a new desired value of the quantity of heat.

However, should the request in step 14 not be applicable, a request will be made in the next step 17 to determine whether or not the desired value of the quantity of heat that was taken as the basis in step 12 exceeds a threshold value correlated with $T_{max}$. Should this not be the case, a still operable subvolume 8a is at least still active and if this is located far enough upstream in order not to allow with its timely functioning too high hot running emissions via such a good conversion in an operating temperature state at a later stage, the hot running is closed in a positive sense and the OBD light does not illuminate, cf. step 18. However, should the request in step 17 be applicable, the OBD light will illuminate in step 19.

The subvolumes 8a can for example be checked in detail as follows:

Immediately after the downstream first subvolume 8*a* according to step 12 in FIG. 2 has been heated sufficiently, a rich quantity of exhaust gas matching a subvolume according to step 13 is sent, designated with "1F" below. According to step 14, the binary lambda probe 5 only remains lean if exactly this first subvolume 8*a* is actually operable in the light-off area 8 downstream, because the following downstream subvolumes or the further catalytic converter volumes situated downstream on the other side of the light-off area 8 cannot yet be active at this point in time because of the too low quantity of heat input. A subvolume 8*a* evaluated as operable is designated with "+" below and a non-operable subvolume with "−".

If the first subvolume was +, a rich quantity of exhaust gas, i.e. 2F matching two subvolumes must be sent to evaluate the second subvolume advantageously selected approximately equally large because in the case of a quantity of exhaust gas 1F, the operable first subvolume would already ensure a lambda probe signal which remains lean. In the case of a quantity of exhaust gas 2F, a 'location-dependent operable signature' results for the two first subvolumes, which is either:

++ or +−, in which case, the sequence of the evaluations + and − corresponds to the sequence of the subvolumes downstream in the light-off area.

If the result is ++, a quantity of exhaust gas 3F must subsequently be sent at this point in time if the downstream third subvolume has been heated whereupon either the signature +++ or ++− is determined. If the result is +−, at least a quantity of exhaust gas 2F must subsequently be sent; however, a quantity of exhaust gas 3F can also be sent, in which case, the signatures +−+ and +−− must indeed be distinguished on the basis of the duration in time of the rich exhaust gas lambda signal necessary for this situation! (thus, compared with +−−, +−+ is indicated with a shorter rich signal).

In the case of the subsequent examination of the fourth subvolume, either the actual quantity of exhaust gas 4F really needed only for the signature +++ can be sent, independent of the preceding signature, in which case, different signatures such as +−−− and +−−+ must be distinguished on the basis of the length in time of the rich signal. An alternative manner is that the rich quantity of exhaust gas provided for examining a certain subvolume can, depending on the result of the evaluation of the upstream subvolumes of the subvolume to be examined, specifically be selected in such a way that when a quantity m of the upstream subvolumes were evaluated as operable, a rich quantity of exhaust gas is sent to examine the specific subvolume that is measured in such a way that m+1 lighted-off and operable subvolumes ought to be present to keep the resulting exhaust gas lambda lean. For example, in the case of the given signature +−−, i.e. m=1, a quantity of exhaust gas (m+1)F, i.e. 2F can be sent in order to distinguish between the signatures +−−− and +−−+.

The examination strategy (switch off the lambda probe signal after a period of time or the selection of the rich quantity of exhaust gas depending on the previous result) or the combination to be chosen depends on the exact relevant requirements for monitoring the light-off performance and the accuracy or speed, i.e. particularly the light-off performance of the lambda probe 5 by means of which the relevant procedural steps can be implemented and evaluated.

It is possible to proceed in a similar way with the other initial case that is, in practice, more interesting, namely that the first subvolume was "−". If a quantity of exhaust gas 1F is sent to evaluate the second subvolume, the signature −+ or −− results. For the −+result, a localized contamination restricted to the first subvolume can be assumed whereas for the −− result, a continuously aging downstream light-off area is rather more likely. In this case, it is sensible to allocate during the next hot running in step 16, a higher desired value of the quantity of heat for step 12 so that the diagnosis of the light-off area 8 can be started immediately by examining the downstream third subvolume.

In a simplified version, checking can be carried out in such a way that the catalytic converter system, at the point in time when there is initially a quantity of heat input that is sufficient for the light-off of only the downstream first subvolume, is fed with a rich quantity of exhaust gas matching the first subvolume and that the hot running when the exhaust gas lambda remains lean is evaluated as positively closed and when the exhaust gas lambda becomes rich, in the next hot running, a quantity of heat input results that is sufficient for the light-off of only the first two subvolumes that are mainly equally large. Subsequently, a rich quantity of exhaust gas matching a subvolume is sent to the catalytic converter system so that the downstream consecutive subvolumes of the light-off area can be checked in succession in consecutive hot running processes while, in the preceding hot running processes, the first up to nth subvolume were evaluated as non-operable and there is in the (n+1)th hot running a quantity of heat input that is sufficient for the first up to (n+1)th subvolume and a rich quantity of exhaust gas matching a subvolume is then sent to the catalytic converter system.

I claim:

1. A method for monitoring the light-off performance of a catalytic converter system in the exhaust gas duct of an internal combustion engine, comprising the steps of:
    feeding an air/fuel mixture to the catalytic converter system,
    evaluating the light-off performance on the basis of the conversion capacity in a light-off area of the exhaust gas catalytic converter system substantially influencing the emissions of the engine running hot,
    using a quantity of heat input fed with the exhaust gas to the light-off area during hot running up to a point in time as a criterion for successive conversion (light-off) in the downstream consecutive subvolumes of the light-off area, and
    individually testing and evaluating the functional capabilities of at least one of the downstream subvolumes heated consecutively at the respective moment of the light-off.

2. The method according to claim 1, wherein a binary exhaust gas oxygen probe is used to monitor the light-off performance.

3. The method according to claim 1, wherein the defined input of rich quantities of exhaust gas is controlled by means of a linear exhaust gas oxygen probe arranged upstream of the catalytic converter system.

4. The method according to claim 1, wherein the lambda probes of a phase catalytic converter controlled by 3-lambda probe controls are used for monitoring the light-off performance and the conversion capacity of a phase catalytic converter, wherein a linear primary catalytic converter lambda probe, a first binary lambda probe arranged between the primary and main catalytic converter to serve as monitor of the light-off performance and a second binary lambda probe arranged downstream of the phase catalytic converter to serve as monitor of the conversion capacity of the phase catalytic converter are provided.

5. The method according to claim 1, wherein the method can be used within the framework of at least one of an on-board diagnosis and as a workshop diagnosis.

6. The method according to claim 1, comprising the steps of:
- at least at one of the points in time at which a predefined quantity of heat input is reached and a light-off of the corresponding subvolumes can be taken as a starting basis, feeding the catalytic converter system with a defined rich quantity of exhaust gas during lean hot running,
- checking the exhaust gas by means of an operational exhaust gas oxygen probe arranged downstream in the vicinity of the light-off area on starting the conversion, and
- on the basis of the effects of the supply of the defined rich quantities of exhaust gas at the corresponding points in time on the exhaust gas lambda, evaluating the functional capabilities of at least one subvolume of the light-off area.

7. The method according to claim 6, wherein the catalytic converter system, at the point in time when there is a quantity of heat input that is sufficient for the light-off of first only the downstream first subvolume, is fed with a rich quantity of exhaust gas matching the first subvolume and wherein the hot running when the exhaust gas lambda remains lean is evaluated as positively closed and when the exhaust gas lambda becomes rich, in the next hot running, a quantity of heat input results that is sufficient for the light-off of only the first two subvolumes that are mainly equally large whereupon a rich quantity of exhaust gas matching a subvolume is sent to the catalytic converter system so that the downstream consecutive subvolumes of the light-off area can be checked in succession in consecutive hot running processes while, in the preceding hot running processes, the first up to nth subvolume were evaluated as non-operable and there is in the (n+1)th hot running a quantity of heat input that is sufficient for the first up to (n+1)th subvolume and a rich quantity of exhaust gas matching a subvolume is then sent to the catalytic converter system.

8. The method according to claim 6, wherein during the hot running process, the functional capabilities of at least two equally-sized downstream consecutive subvolumes is tested one after the other in the given order, while the catalytic converter system at the consecutive points in time of the light-off of at least two subvolumes is in each case fed with a rich quantity of exhaust gas depending on the quantity of heat input at the specific point in time.

9. The method according to claim 8, wherein for evaluating the functional capabilities of a specific subvolume, should the exhaust gas lambda not remain lean during the passage of a defined quantity of exhaust gas, the length in time of the rich exhaust gas lambda signal can be used to evaluate the functional capabilities of the subvolume.

10. The method according to claim 8, wherein the rich quantity of exhaust gas provided for examining a specific subvolume can, depending on the result of the evaluation of the upstream subvolume to be examined, specifically be selected in such a way that when a quantity m of the upstream subvolumes were evaluated as operable, a rich quantity of exhaust gas is sent to examine the specific subvolume that is measured in such a way that m+1 lighted-off and operable subvolumes ought to be present to keep the resulting exhaust gas lambda lean.

* * * * *